2,202,133

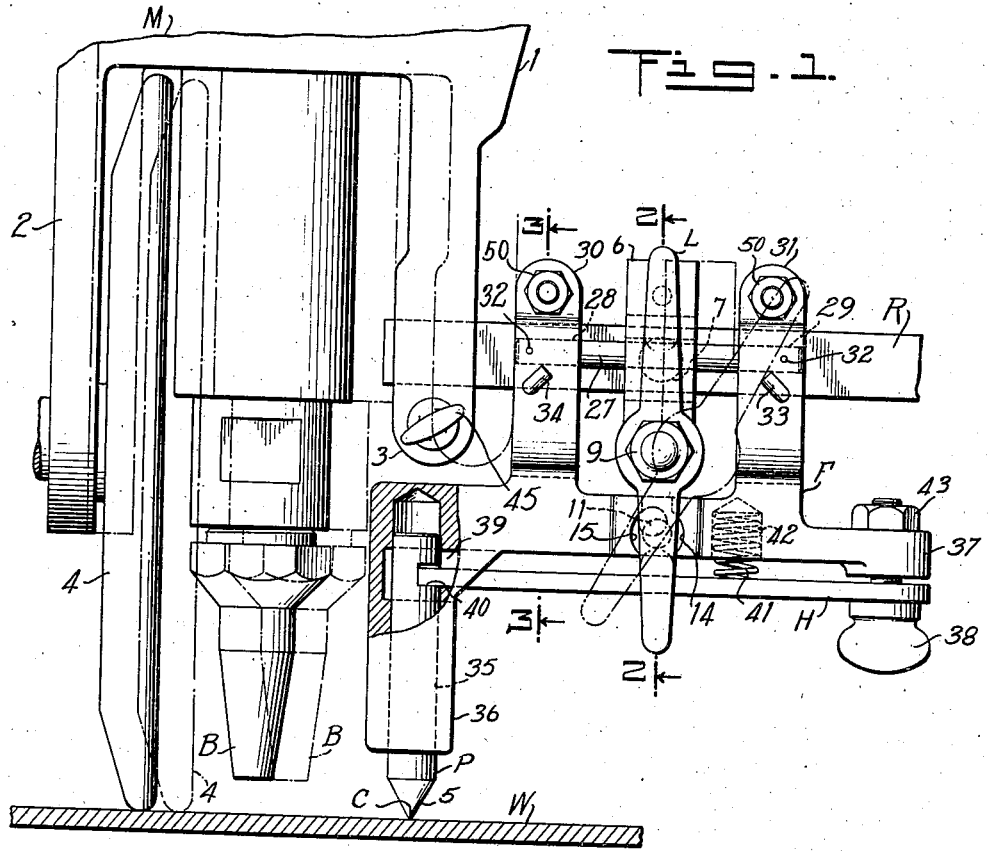
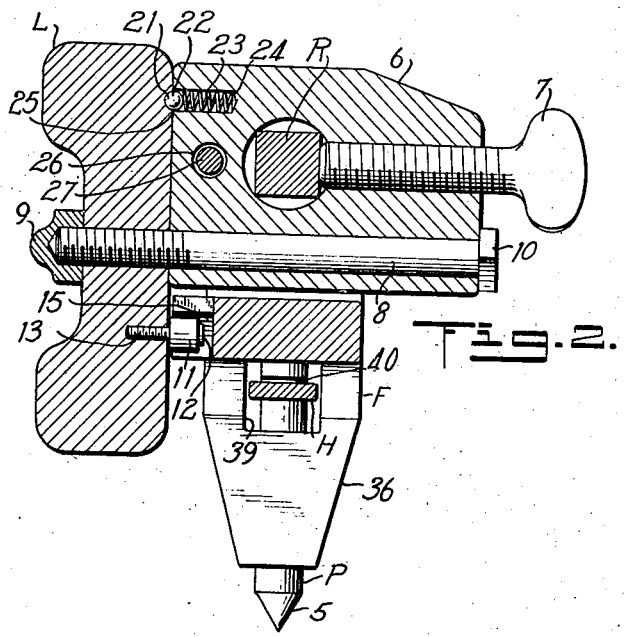
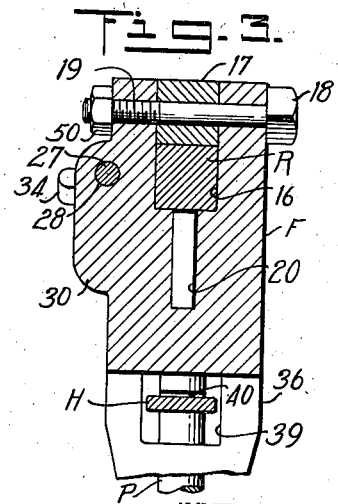
Fig. 1.
Fig. 2.
Fig. 3.
INVENTOR
LLOYD W. YOUNG
ATTORNEY May 28, 1940.   L. W. YOUNG   2,202,133
CIRCLE CUTTING MACHINE
Filed Nov. 29, 1938   2 Sheets-Sheet 2
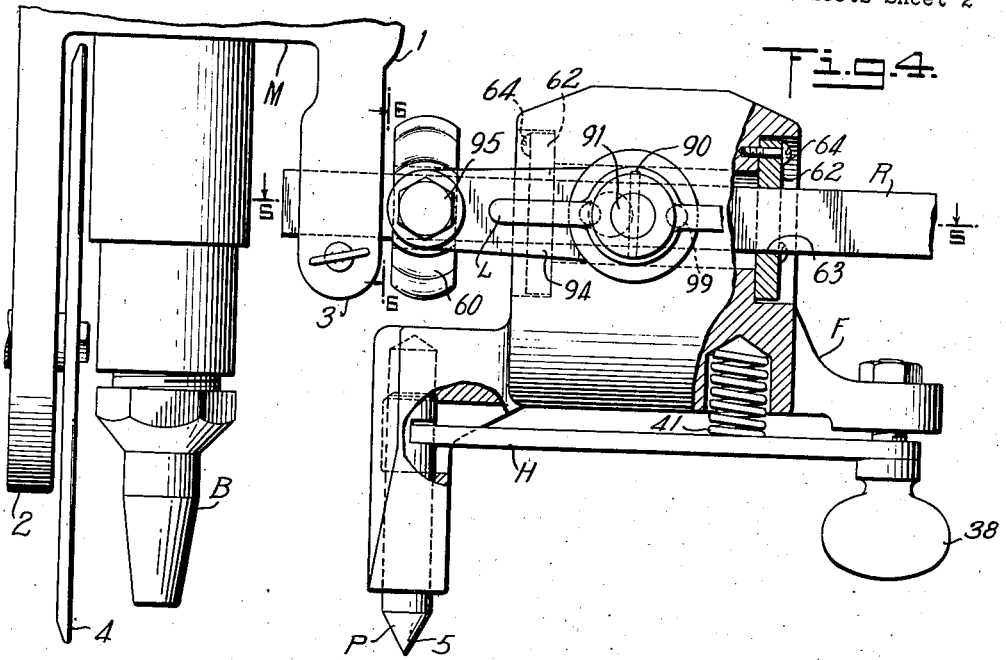
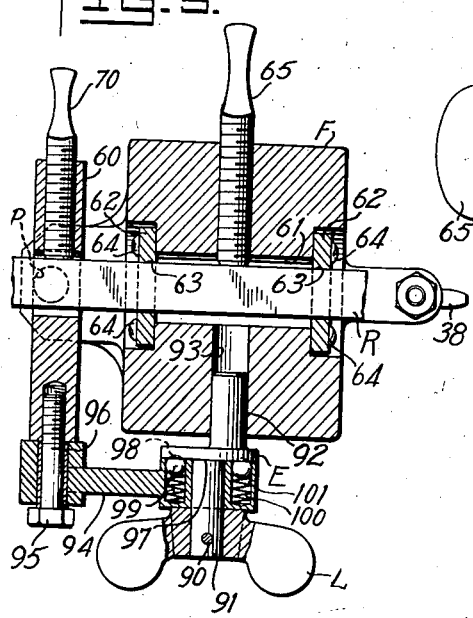
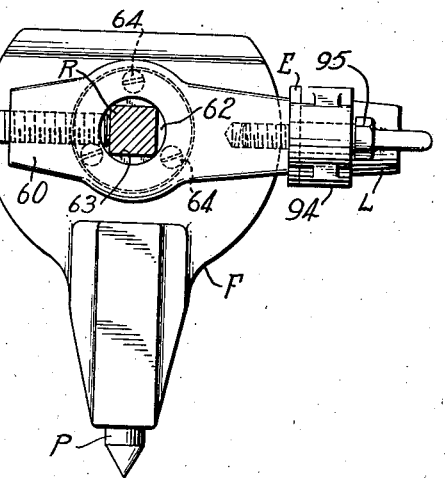
INVENTOR
LLOYD W. YOUNG
BY
*E. L. Greenewald*
ATTORNEY Patented May 28, 1940

UNITED STATES PATENT OFFICE 2,202,133

CIRCLE CUTTING MACHINE

Lloyd W. Young, Scotch Plains, N. J., assignor to Oxweld Acetylene Company, a corporation of West Virginia Application November 29, 1938, Serial No. 242,880

25 Claims. (Cl. 266—23)

This invention relates to cutting machines and more particularly to those of the type employing a blowpipe adapted first by means of a heating jet to raise the temperature of the work, such as a metal plate, to a kindling temperature, and then, by means of an oxidizing jet, piercing the work, and subsequently cutting the work by moving the blowpipe relatively to the work until the desired cut is completed.

With ordinary oxy-acetylene circle cutting machines of the foregoing type, where the blowpipe is mounted thereon in a fixed position, it is customary when cutting a circle to pierce the plate with the oxidizing jet at the starting point on the true line of cut. As the diameter of the pierced hole is considerably larger than the width of the kerf formed by the same nozzle, it will be seen that piercing a plate on the true line of cut prior to cutting a circle will cause an objectionable irregularity to be made in both the external and internal piece. It is therefore highly desirable to provide means for starting the cut off the line of the circle to be cut, either inside or outside thereof, and then moving the cutting jet into the line of cut, before traversing the circular path, so that the finished work has a perfect circle as a result of the cut. That is to say, if the finished work is a disk, it has a smooth circular periphery; and if a hole, it has a smooth circular wall.

Heretofore, in some circle cutting machines, the means provided for accomplishing the above result have required the use of both hands of the operator so that the forces exerted in shifting the parts of the machine often resulted in the center pin being lifted out of the center hole, loss of time, and general inconvenience to the operator, as well as poorly finished work.

Experience has proven also that, when an operator cannot readily lift the center point or pin, he will invariably scrape the center point over the work, with the result that the work surface is marred and scored, and the point soon becomes so dull that it thereafter fails to remain in the center punch mark in the work when cutting a circle. This is especially true in machines of the type employing a weighted or spring-actuated center pin, the work often being marred by the point or pin scratching the work as the machine is rolled from one circle cutting position to another, because of the difficulty in tilting the machine properly and sufficiently to have the point of the pin clear the surface of the work, as desired. This operation also requires the full use of both hands of the operator, and consequent loss of time.

It is also highly desirable in circle cutting machines that resilient means be employed to urge the center pin against the work so as to apply a substantially constant pressure at the fulcrum and to compensate for warpage and other surface irregularities. The usefulness of such a center pin may be enhanced if some means is provided for adjusting the pressure applied to the pin to obtain most satisfactory operation when cutting both small and large circles.

In view of the foregoing, the main objects of my invention are: to provide a blowpipe cutting machine that is simple and economical in its parts and efficient and effective in operation; and to provide in such a machine features overcoming the disadvantages of the prior art referred to above. Another object of the invention is to provide a circle cutting machine of the type set forth, having manually operated means whereby the operator may, by the use of one hand, conveniently and readily shift the blowpipe off and on the line of cut. A further object of the invention is to provide in a circle cutting machine having a spring loaded center pivot or point, means for manually adjusting the pressure of the spring actuating the center pivot or point, as desired, either before or during the cut. Another object of the invention is to provide readily accessible means for manually raising the center point to clear the surface of the work while changing the position of the machine. A further object is to improve and increase the scope of usefulness of the Portable blowpipe machine disclosed and claimed in my Patent No. 2,148,666, issued February 28, 1939. These and other objects of my invention will be apparent to those skilled in the art from the following description taken in connection with the accompanying drawings, in which:

Fig. 1 is a fragmentary view mainly in side elevation of a circle cutter or cutting machine embodying the features of my invention, a portion of the center pin frame being broken away and shown in cross section;

Fig. 2 is a vertical cross-sectional view of the machine taken on line 2—2 of Fig. 1; and Fig. 3 is a fragmentary vertical sectional view taken on line 3—3 of Fig. 1;

Fig. 4 is a fragmentary view in side elevation of a modification, parts being broken away and shown in cross-section;

Fig. 5 is a fragmentary sectional view on a slightly reduced scale, taken on a line corresponding to line 5—5 of Fig. 4; and Fig. 6 is a view partly in front elevation and partly in vertical section on a slightly reduced scale taken on a line corresponding to line 6—6 of Fig. 4.

My invention comprises a circle defining attachment for a cutting machine, which when assembled with a blowpipe and its wheeled or skid support, constitutes a circle cutting machine.

My circle defining attachment per se preferably is adapted for use with a radius rod or bar adapted to be secured to a blowpipe. Between the radius bar and such body I provide means for manually changing the effective radius of said bar to a limited extent. Means for securing the body in position on the bar is provided for fixing the effective radius of the device. A spring loaded center pin is preferably associated with said body together with means for adjusting the spring force acting on said center pin. I also provide means for easily manually elevating said center pin while shifting the device over the work from one position to another to obviate scratching the work.

Referring to the drawings, a preferred embodiment of my invention is shown by way of example in conjunction with an oxy-acetylene cutting machine M of the type shown in my Patent No. 2,148,666, issued February 28, 1939. The carriage of the machine M is provided with a fork 1, the tines of which are indicated at 2 and 3. A blowpipe B is slidably mounted within the fork to permit vertical adjustment of the blowpipe flame in relation to the work W. A traction or driving wheel 4 is mounted within the fork and is adapted to rotate the blowpipe in a circular path about a center pin P, being driven by a suitable motor (not shown). A substantially rigid radius rod R, which is suitably clamped at one end within a bifurcated portion of the tine 3, extends away from the blowpipe and traction wheel in a direction preferably parallel to the traction wheel axis. A normally stationary member 6 may be adjustably positioned on the radius rod R by means of a thumb screw 7.

Referring to Figs. 1 and 2, a relatively large double winged hand lever L is threaded onto a shaft 8 journalled in the member 6, and is locked in place thereon preferably by an acorn nut 9 which serves as a jam nut. The other end of the shaft 8 is provided with an enlarged thrust flange, such as a hexagon head 10. The lower portion of the winged lever L is provided with a roller 11 adapted to rotate on a stub shaft 12 threaded into the winged lever at 13. Referring to Figs. 1 and 2, it will be seen that the roller 11 is adapted to coact with the inner faces of lugs 14 and 15, respectively, constituting extensions of a center pin frame F.

Referring to Fig. 3, the frame F preferably is machined at 16 to receive the radius rod R which is held in position by a spacer 17. The cap screw 18 is threaded through one side of the frame F at 19 and is adjusted to permit free sliding movement of the frame F relatively to the radius rod R. A lock nut 50 on the screw 18 acts to prevent any rotation of the latter which would disturb the fit between the frame and radius rod. A section of the frame F preferably is removed at 20 to permit a slight flexing of the frame F during adjustment of the cap screw 18.

The upper end of the winged hand lever L, as shown in Fig. 2, is recessed at 21 to receive a part of a ball 22 that is urged outwardly by a compression spring 23. A recess 24 in the stationary member 6 accommodates the spring 23 and most of the ball 22. The ball and spring preferably are held within the recess 24 by peening over a small portion of the metal at the rim of the recess 24, as indicated at 25.

Occasionally it is necessary to remove the entire center weight assembly from the radius rod R, so that the following means is provided for preventing the stationary member 6 from becoming detached from the frame F. Referring to Fig. 2, a drilled hole 26 through the stationary member 6 surrounds a rod 27 that extends through the frame F at 28 and 29, Fig. 1, in the upstanding parts 30 and 31, respectively, of the frame. The rod 27 is secured to the upstanding part 31 of the frame by a pin 32, thus preventing the stationary member 6 and the frame F from becoming separated.

Normally, the pivotal hand lever L is in a vertical position, as shown in Fig. 1, in which position the blowpipe B is properly located over the true line of cut with the pointed end 5 of the center pin P engaging a center punch mark C formed in the work surface. When it is desired to pierce the work inside the line of cut, the hand lever L is first rotated clockwise, as shown in dotted lines in Fig. 1, until contact is made with a stop 33 on the upstanding part 31 of the frame F. Rotation of the hand lever in such direction causes the roller 11 to contact the inner face of lug 15, providing relative movement between the frame F and the member 6, but since the pin P locates the frame F relative to the work surface, and since the stationary member 6 is secured to the radius rod R, the entire carriage of the machine M is shifted to the right, so that the traction wheel 4 and the blowpipe B are drawn toward the center point 5. With the blowpipe in this position, the work is pierced in the usual manner and the driving motor is started. When the cut has progressed a short distance, the hand lever L is slowly rotated counterclockwise, until the ball 22 snaps into recess 21. When the lever L is thus returned to a vertical position, the blowpipe again occupies a position directly over the true line of cut. Since the center point 5 occupies a fixed position in the center punch mark C of the work W, the drive wheel obviously sideslips during the shifting operation.

Piercing the work outside of the line of cut is carried out in a manner similar to that outlined above, except that the hand lever L is initially pivoted in a counterclockwise direction until the hand lever L engages stop 34 on the upstanding part 30 of the frame F. With the stationary member 6 secured to the radius rod R, partial rotation of the hand lever L in a counterclockwise direction causes the roller 11 to contact the inner face of the lug 14 on the frame F, thereby moving the fork 1 and the blowpipe B away from the center pin P. With the blowpipe in this position, a hole may be pierced in the work W outside of the line of cut, and after the cut has progressed a short distance, the hand lever L may be returned to the neutral or vertical position, thereby moving the blowpipe B over to the true line of cut.

From the foregoing, it can be seen that, with the stationary member 6 secured to the radius rod R, partial rotation of the hand lever L causes the blowpipe B to be moved closer to or further from the center pin P, depending on the direction of rotation.

The pivot or center pin P is slidably mounted in a socket 35 provided therefor in a depending part 36 of the frame F. A center pin lifting bar H is disposed under the horizontal part 37 of the frame F, one end of the bar H being supported by a thumb screw 38 and the other end extending into a cavity 39 in the frame F and projecting into a lateral groove 40 formed in the center pin P. With this arrangement the point 5 may be elevated to clear the surface of the work W by grasping and lifting the bar H, a normal hand operation which is naturally performed when shifting the cutting machine from one position to another.

A coiled compression spring 41 in a socket 42 in the frame F engages the lifting bar H at a point located between the thumb screw 38 and the center pin P to thereby resiliently project the center point 5 firmly into contact with the work at the center punch mark C thereof. Ample clearance is provided beneath the bar H for the operator's hand when raising the center pin P off the work. The pressure of the center point 5 upon the work may be varied by rotating the thumb screw 38, which acts to compress the spring 41. A jam nut 43 is provided on the upper end of the thumb screw 38 and serves to prevent a change in its adjustment. Thumb screw 38 is for varying the spring tension on point 5 depending on the radius being cut. The radius rod R preferably is secured to tine 3 of fork 1 by a winged clamping screw 45.

Referring to Figs. 4, 5 and 6, there is shown a modification of my invention that is in some respects preferable to that described above in connection with Figs. 1, 2 and 3, because of its greater simplicity and consequent economy in manufacture. Essentially, however, the devices are similar, as will be apparent from the following description; it being understood that the cutting machine carriage M, fork 1, tines 2 and 3, blowpipe B, wheel 4, center pin P, radius rod R, thumb screw 38, and flat bar H may be substantially the same as the corresponding parts referred to above in the description of the embodiment of Figs. 1 to 3, inclusive.

A normally stationary member or bar clamp 60 is adjustably positioned on the radius rod R by means of a thumb screw 70. By changing the position of the clamp 60 on the rod R, the radius of the circle to be cut may be fixed, as desired. The pivotal wing-lever L is connected by a pin 90 to the stub crank 91 of an eccentric E having a stub shaft 92 journalled in the bore 93 of the center pin frame or body F. A link 94 is pivoted at one end to the member 60 by means of a pin 95 threaded to the member 60, there being a cylindrical bushing 96 disposed between the pin 95 and link 94 to reduce friction between these parts. The face 97 of the eccentric E is provided with concavities 98 for receiving balls 99 under the influence of the compression springs 100 in bores 101 in the adjoining end of the link 94, such end of the link being disposed between the eccentric face 97 and wing-lever L on the stub crank 91. Thus, when the wing-lever L is operated, the radius rod R is shifted relatively to the body or frame F for off-the-line piercing, and the locating means 98, 99 acts to retain the device at the proper radius of the circle to be cut.

The frame F has a central bore 61 for the passage of the radius rod R, guide washers 62 being countersunk in the body F at opposite ends of the bore for cooperation with the radius rod. The guide washers 62 are formed with square holes 63 corresponding to the square cross-section of the radius rod, and are secured to the body by screws 64 to guide movement between the body F and radius rod R to one longitudinally of the latter. The radius rod and frame F may be locked in position, if desired, by tightening a thumb screw 65 threaded in the frame for engagement with the radius rod. Otherwise the construction of the modification of Figs. 4 to 6 is substantially like that of the embodiment of Figs. 1 to 3. The operation of the two devices is substantially similar also, as will be apparent to those skilled in the art without further elaboration.

A feature of importance in my invention resides in the reversible mounting of the center point frame or body F on the radius rod R. This increases the scope of utility of the device, inasmuch as the effective radius of the circle to be cut may be substantially increased by simply removing and turning the attachment about an angle of 180° relative to the blowpipe carriage, or by removing, turning and replacing the body F on radius rod R.

From the foregoing description of my invention, it will be apparent to those skilled in the art that I provide readily operable means for adjusting the machine to pierce the workpiece, either inside or outside of the true line of cut, and simple lever means whereby the cutting blowpipe may then be manually moved over to the true line of cut. This requires the use of only one simple hand operation, and results in a saving of time and more accurate work over prior devices.

As previously pointed out, an additional refinement of the invention is the adjustable spring loaded center point, the spring pressure of which may be adjusted as desired. When extremely small radii are to be cut, it will be found advantageous to increase the pressure of the spring upon the center point, and on a large radius it is usually desirable to reduce the spring pressure on the center point to prevent tipping of the machine. Furthermore, when cutting a large circle in a badly warped plate, it is possible to adjust the pressure of the spring on the center point during operation of the machine, to compensate for the warpage.

The flat bar H extending between the adjustable thumb screw and center point is arranged so that it is readily accessible, for an operator to raise the center point while rolling the machine over the work, thereby minimizing the possibility of scoring the work surface and dulling the point. Experience has proven that when an operator cannot readily lift the center point he will invariably scour the center point over the work, with the result that the point soon will become dull and fail to remain in the center punch mark in the work when cutting the circle. This is entirely eliminated by my invention.

It will thus be seen that I provide an adjustable spring loaded center point for radius cutting, such center point being attached to a movable member which permits piercing a plate outside or inside the true line of cut, together with means for accurately and quickly positioning the cutting blowpipe over the line of cut. The invention is very efficient and effective in operation, as will be apparent to those skilled in the art.

Various modifications may be made of the invention herein disclosed without departing from the scope thereof or sacrificing any of its advantages and novel features.

I claim:

1. A circle cutting machine comprising a blowpipe carriage having a traction wheel adapted to roll on the work, a center pin resiliently urged against said work, means including a hand lever for changing the radial distance between said center pin and said blowpipe carriage, the arrangement being such that the operation of said hand lever acts to change the radial distance between said center pin and said carriage, and a center pin lifting bar for elevating said center pin above the work surface.

2. A circle cutter comprising a blowpipe, a carriage supporting said blowpipe for movement in a circular path about a central point, a center pin adapted to engage the work at said central point for controlling the movement of said carriage, spring means for projecting said center pin into engagement with such work, and manually operated means for lifting said center pin out of engagement with such work and against the force of said spring means.

3. A circle cutting machine comprising a blowpipe carriage, a center pin adapted to engage the work, means connecting said center pin to said carriage for limited free axial movement, spring means adapted to project said center pin into engagement with the work, and means for adjusting the force of said spring means, said last-named means including a center pin lifting bar against which said spring operates.

4. A circle cutting machine comprising a blowpipe carriage, a center pin adapted to engage the work, means connecting said center pin to said carriage for limited free axial movement, spring means adapted to project said center pin into engagement with the work, and means for adjusting the force of said spring means.

5. A cutting machine comprising a blowpipe carriage having a wheel adapted to roll on the work, a center pin, a center pin lifting bar, spring means urging said center pin lifting bar to project said center pin into engagement with such work during cutting, and means for adjusting the movement of said center pin lifting bar so that said center pin may be elevated clear of such work while rolling the carriage thereon.

6. A cutting machine comprising a blowpipe carriage, a center pin adapted to be supported by the work, a center pin lifting bar, resilient means urging said center pin into engagement with such work, and means for adjusting the pressure of said resilient means.

7. A cutting machine comprising a blowpipe carriage, a center pin adapted to be supported by the work, a center pin lifting bar, spring means urging said center pin lifting bar to project said center pin into engagement with such work, and means for adjusting said center pin lifting bar and said center pin.

8. In a cutting machine, the combination with a carriage having a fork, a driving wheel mounted on one tine of said fork, and a blowpipe slidably mounted on said carriage in spaced relation to said wheel, of a radius rod having one end portion disposed in the other tine of said fork, a clamping screw associated with said fork for securing said radius rod in place, a center pin, a center pin frame, a center pin lifting bar associated with said center pin frame, a spring urging said center pin lifting bar and center pin downwardly, and means including a lever for manually shifting said radius rod relatively to said center pin frame to change the radial distance between said center pin and said blowpipe, the arrangement being such that the operation of said hand lever acts to change the radial distance between said center pin and said carriage.

9. In a cutting machine, the combination with a carriage, and a blowpipe slidably mounted on said carriage, of a radius rod secured to said carriage, a center pin, a center pin frame, a center pin lifting bar associated with said center pin frame, and means including a lever for manually shifting said radius rod relatively to said center pin frame to change the radial distance between said center pin and said blowpipe, the arrangement being such that the operation of said hand lever acts to change the radial distance between said center pin and said carriage.

10. A cutting machine comprising a carriage, a driving wheel associated with said carriage, a blowpipe mounted on said carriage, a center pin frame, a radius rod secured to said carriage and slidably mounted in said center pin frame, a center pin mounted in said center pin frame for axial movement and having a lateral slot, a center pin lifting bar underlying said center pin frame and engaging said center pin in said lateral slot, a spring urging said center pin lifting bar away from said center pin frame, adjustable means connecting said lifting bar to said center pin frame so that said lifting bar is free to tilt to a limited degree depending upon the adjustment of said means, and means including a relatively large double winged hand lever for shifting said radius rod relatively to said center pin frame to change the radial distance between said blowpipe and said center pin, the arrangement being such that the operation of said hand lever acts to change the radial distance between said center pin and said carriage.

11. A cutting machine comprising a carriage, a driving wheel associated with said carriage, a blowpipe mounted on said carriage, a center pin frame, a radius rod secured to said carriage and slidably mounted in said center pin frame, a center pin mounted in said center pin frame for axial movement and having a lateral slot, a center pin lifting bar underlying said center pin frame and engaging said center pin in said lateral slot, a spring urging said center pin lifting bar away from said center pin frame, and adjustable means connecting said lifting bar to said center pin frame so that said lifting bar is free to tilt to a limited degree depending upon the adjustment of said means.

12. A cutting machine comprising a carriage, a driving wheel associated with said carriage, a blowpipe mounted on said carriage, a center pin frame, a radius rod secured to said carriage and slidably mounted in said center pin frame, a center pin mounted in said center pin frame for axial movement, means for urging said pin against a work surface, and means including a relatively large double winged hand lever for shifting said radius rod relatively to said center pin frame to change the radial distance between said blowpipe and said center pin, the arrangement being such that the operation of said hand lever acts to change the radial distance between said center pin and said carriage.

13. In a cutting machine, the combination with a carriage having a fork, a blowpipe slidably mounted within said fork to permit vertical adjustment of the cutting flame in relation to the work, and a driving wheel within said fork, of a radius rod secured to said carriage at one side of said fork, a stationary member secured to said radius rod for longitudinal adjustment, a double winged lever mounted on said stationary member, a center pin frame comprising a horizontal part, spaced upstanding parts, and a depending part, said radius rod being slidably mounted in said upstanding parts with said stationary member therebetween, spaced lugs on said horizontal part, a roller on said lever adapted to coact with said lugs to advance and retract said radius rod when said lever is operated to change the radial distance between said blowpipe and said center pin frame, a center pin mounted in said depending part for limited axial movement, a center pin lifting bar underlying said horizontal part, and spring means urging said lifting bar away from said horizontal part.

14. In a cutting machine, the combination with a blowpipe, of a radius rod connected to said blowpipe, a stationary member secured to said radius rod, a hand lever mounted on said stationary member, a center pin frame comprising a horizontal part, spaced upstanding parts, and a depending part, said radius rod being slidably mounted in said upstanding parts with said stationary member therebetween, spaced lugs on said horizontal part, a roller on said lever adapted to coact with said lugs to advance or retract said radius rod when said lever is operated to change the radial distance between said blowpipe and said center pin frame, a center pin mounted in said depending part for limited axial movement, a center pin lifting bar underlying said horizontal part, spring means urging said lifting bar away from said part, and adjustable means limiting the movement of said lifting bar relatively to said horizontal part.

15. In a cutting machine, the combination with a blowpipe, of a radius rod connected to said blowpipe, a stationary member secured to said radius rod, a hand lever mounted on said stationary member, a center pin frame comprising a horizontal part, spaced upstanding parts, and a depending part, said radius rod being slidably mounted in said upstanding parts with said stationary member therebetween, spaced lugs on said horizontal part, a roller on said lever adapted to coact with said lugs to advance or retract said radius rod when said lever is operated to change the radial distance between said blowpipe and said center pin frame, and a center pin mounted in said depending part.

16. In a cutting machine, the combination with a carriage having a fork, a blowpipe slidably mounted within said fork to permit vertical adjustment of the cutting flame in relation to the work, and a driving wheel associated with said carriage at one side of the fork, of a radius rod secured to said carriage at one side of said fork, a stationary member secured to said radius rod for longitudinal adjustment, a center pin frame comprising a horizontal part, spaced upstanding parts, and a depending part, said radius rod being slidably mounted in said upstanding parts with said stationary member therebetween, a center pin mounted in said depending part for limited axial movement, a center pin lifting bar underlying said horizontal part, and spring means urging said lifting bar away from said part.

17. A circle defining attachment for a blowpipe, comprising a radius rod adapted to be secured to said blowpipe, a body associated with said radius bar for longitudinal sliding adjustment, means for changing the effective radius of said bar to a limited extent, means for locking said body in position on said radius bar, a spring loaded center pin associated with said body, means for adjusting the spring force acting on said center pin, and means for elevating said center pin clear of the work while shifting from one position to another.

18. A circle defining attachment for a blowpipe, comprising a radius rod adapted to be secured to said blowpipe, a body associated with said radius bar for longitudinal sliding adjustment, means for changing the effective radius of said bar to a limited extent, a spring loaded center pin associated with said body, and means for adjusting the spring force acting on said center pin.

19. In a device of the class described, the combination with a center pin, and a radius bar, of a member adapted to be secured to said radius bar, a body associated with said center pin and having a bore for the passage of said radius bar, guide washers for said radius bar countersunk in said body at the opposite ends of said bore, an eccentric journalled to said body, a manually operable crank on said eccentric, a link connecting said member and said crank, locating means disposed between said eccentric and said link, and means for locking said body in position on said radius bar.

20. In a device of the class described, the combination with a center pin, and a radius bar, of a member adapted to be secured to said radius bar, a body associated with said center pin and having a bore for the passage of said radius bar, an eccentric journalled to said body, a manually operable crank on said eccentric, a link connecting said member and said crank, and locating means disposed between said eccentric and said link.

21. A blowpipe apparatus comprising a carriage free to move universally in a plane over a working surface; a blowpipe supported by said carriage; a traction wheel rotatably secured to said carriage and engaging the working surface; a rigid radius rod secured to said carriage substantially parallel to the working surface; a pivot point extending from said rod toward the working surface; resilient means for urging said point against the surface; and means underlying said radius rod for lifting said center point relatively thereto.

22. In a portable blowpipe apparatus, a carriage having at least one wheel-support in rolling contact with a working surface; a blowpipe supported by said carriage; a rigid radius rod secured to said carriage substantially parallel to the working surface; a pivot point depending from said rod and movable toward and away from the working surface; resilient means for urging said point against said surface; and means including a lifting bar underlying said radius rod and engaging said center point for lifting said center point relatively thereto.

23. A centering device for a blowpipe supporting machine adapted to be guided by a radius rod about circular paths over a work surface, said device comprising a member adapted to be rigidly secured to such radius rod; a center pin frame adjacent to said member and having a center pin depending therefrom for engagement with the work surface at the center of the desired circular path; and shifting means connected between said frame and said member and operative to move said frame relative to said member, thereby causing a predetermined amount of relative movement between said radius rod and said center pin to change the radius of said circular path.

24. Device as claimed in claim 23 wherein said member is mountable on and is slidable along said radius rod.

25. A centering device for a blowpipe supporting machine adapted to be guided by a radius rod about circular paths over a work surface, said device comprising a member adapted to be rigidly secured to such radius rod; a center pin frame adjacent to said member and having a center pin depending therefrom for engagement with the work surface at the center of the desired circular path; and manually operable means pivotally secured to said member and operative on said frame to provide a predetermined amount of relative movement between said member and said frame, thereby changing the relative position between said pin and said radius rod, and altering the effective radius of said circular path.

LLOYD W. YOUNG.